(No Model.)

J. MASSEY.
WAGON BRAKE.

No. 257,733. Patented May 9, 1882.

Attest:
Charles Pickles.
Geo. H. Knight.

Inventor:
John Massey
By Knight Bro.
Attys.

UNITED STATES PATENT OFFICE.

JOHN MASSEY, OF SALEM, MISSOURI.

WAGON-BRAKE.

SPECIFICATION forming part of Letters Patent No. 257,733, dated May 9, 1882.

Application filed January 4, 1882. (No model.)

*To all whom it may concern:*

Be it known that I, JOHN MASSEY, of Salem, in the county of Dent and State of Missouri, have invented a certain new and useful Improvement in Wagon-Brakes, of which the following is a full, clear, and exact description, reference being had to the accompanying drawings, forming part of this specification.

My invention relates to that class of brakes which operate on the hub of the wheel, and also to those in which a strap is employed.

My improvement consists in securing one end of the friction-strap to the bolster or other stationary part of the vehicle, then passing the other end under and over the hub to the vertical arm of a horizontal rock-shaft, as hereinafter described.

My improvement consists, further, in securing the stationary end of the friction-strap to a bracket by suitable means to render it detachable, as hereinafter described.

Figure 1:
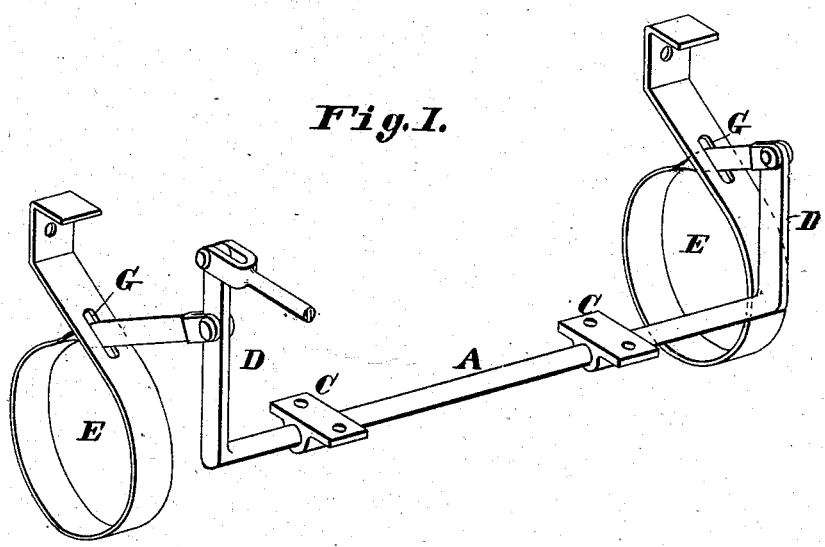
Figure 2:
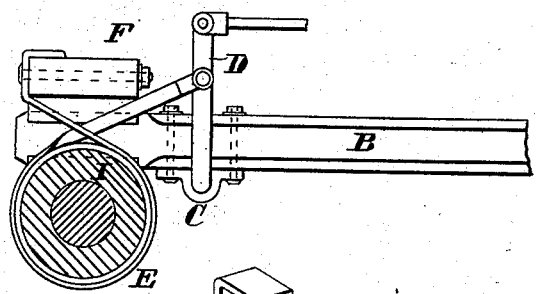
Figure 3:
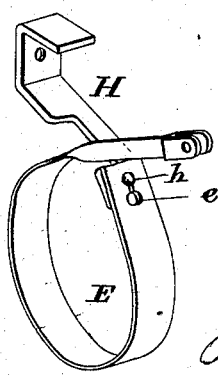

In the drawings, Figure 1 is a perspective detached view. Fig. 2 is a side elevation, showing part of the running-gear of a wagon with the hub and axle in section. Fig. 3 is a perspective view of a modification of the strap, which consists of two pieces suitably connected together, as hereinafter explained.

A represents the common rock shaft, secured to the hounds B by suitable brackets, C C.

D D are the cranks of the shaft.

E is the strap-brake, one end of which is rigidly secured to the bolster F of the vehicle, or it may be secured to any other stationary part of the wagon, as to the axle or cross-rod, or to a device made for the purpose. The other end of the strap is secured to the crank D, substantially as shown.

The brake operates on the inner end of the hub I. One end of the band may have a slot or opening, G, to allow the passage of the other end, as shown in Fig. 1, or a portion of that end of the band may be cut away for the same purpose. (See Fig. 3.)

In the modification shown in Fig. 3 the band consists of two pieces, the piece H consisting preferably of a malleable-iron strip, being secured by one end to the bolster or its equivalent, and having on the other end a hook, $h$, for engaging with an eye, $e$, in the free end of the other member. The object of thus making the strap in two pieces would be that when the part working on the hub becomes worn it can be duplicated at a small cost and without much trouble.

It will be seen that my brake operates on almost the entire surface of the hub by surrounding it, and it will also be understood, as one end of the strap is rigidly secured to a stationary object, that when the band is brought to bear upon the hub by means of the operating-lever it will be tightened by the friction between it and the hub as the wheel revolves. Thus when the brake is once put on the braking will be assisted, and to a great extent accomplished, by the wheel itself.

I do not claim to be the first inventor of a strap-brake applied to the hub; but I do claim to be the first inventor of such a brake when applied as shown and described.

The brake may be applied to spring-wagons, buggies, &c., and the stationary end be secured in any desired mechanical way. It may also be applied to one or both of the back wheels.

Having thus described my invention, the following is what I claim as new therein and desire to secure by Letters Patent:

1. The combination of friction-strap E and horizontal rock-shaft A, having crank arm or handle D, one end of said friction-strap being secured to a stationary part of the vehicle and the other end passed under and over the hub of a wheel and secured to the crank arm or handle, substantially as set forth.

2. The combination of bracket H, removable and replaceable friction-strap E, horizontal rock-shaft A, and crank-arm or handle D, as set forth.

JOHN MASSEY.

Witnesses:
  DUDLEY VANDERBILT,
  S. H. SHERLOCK.